United States Patent
Li et al.

(10) Patent No.: US 10,698,566 B2
(45) Date of Patent: Jun. 30, 2020

(54) TOUCH CONTROL BASED APPLICATION LAUNCH

(71) Applicant: Lenovo (Beijing) Limited, Beijing (CN)

(72) Inventors: Xiao Fei Li, Beijing (CN); Jian Li Liu, Beijing (CN); Xue Gong Zhou, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 0 days.

(21) Appl. No.: 15/465,336

(22) Filed: Mar. 21, 2017

(65) Prior Publication Data

US 2017/0269775 A1     Sep. 21, 2017

(30) Foreign Application Priority Data

Mar. 21, 2016   (CN) .......................... 2016 1 0162624

(51) Int. Cl.
  *G06F 3/041*    (2006.01)
  *G06F 3/0481*   (2013.01)
  *G06F 3/0488*   (2013.01)

(52) U.S. Cl.
  CPC ...... *G06F 3/04817* (2013.01); *G06F 3/04883* (2013.01)

(58) Field of Classification Search
  CPC .................................................. G06F 3/04817
  USPC ......................................... 345/650; 715/840
  See application file for complete search history.

(56) References Cited

U.S. PATENT DOCUMENTS

| 2010/0026640 A1* | 2/2010  | Kim ...................... G06F 3/0414 345/173 |
| 2010/0162108 A1* | 6/2010  | Stallings ............. G06F 3/04817 715/702 |
| 2012/0030623 A1* | 2/2012  | Hoellwarth ......... G06F 3/04817 715/811 |
| 2014/0123081 A1* | 5/2014  | Park ........................ G06F 21/36 715/863 |
| 2015/0020032 A1* | 1/2015  | Chen ...................... G06F 3/017 715/857 |
| 2015/0319364 A1* | 11/2015 | Jin ..................... H04N 5/23245 348/220.1 |
| 2016/0259497 A1* | 9/2016  | Foss ...................... G06F 3/0482 |

FOREIGN PATENT DOCUMENTS

| CN | 102722321 A | 10/2012 |
| CN | 102810046 A | 12/2012 |
| CN | 103092464 A | 5/2013 |
| CN | 103279295 A | 9/2013 |

(Continued)

*Primary Examiner* — Roy P Rabindranath
(74) *Attorney, Agent, or Firm* — Kunzler Bean & Adamson

(57) ABSTRACT

A method is disclosed. The method includes determining a touch control parameter of a touch control operation at an identifier corresponding to an application program. The method also includes determining a touch control type based on the touch control parameter. The method also includes invoking a first element related to the application program in response to a determination that the touch control operation is a first type of touch control. The method also includes invoking a second element related to the application program in response to a determination that the touch control operation is a second type of touch control.

14 Claims, 4 Drawing Sheets

(56) References Cited

FOREIGN PATENT DOCUMENTS

| CN | 103677242 A | 3/2014 |
| CN | 104915096 A | 9/2015 |
| KR | 1020140002146 A | 1/2014 |

* cited by examiner

TOUCH CONTROL BASED APPLICATION LAUNCH

FIELD

The subject matter disclosed herein relates to the field of electronic user interfaces, and in particular, to a touch-sensitive user interface.

BACKGROUND

Technology development drives social progress and communication technology is developing rapidly, becoming increasingly relied upon by the general public. Electronic devices, such as smart phones, tablet computers, and smart watches, have become a part of people's lives. While electronic devices are rapidly popularized, application programs of various types and functions are being developed, bringing significant convenience to people's lives.

In electronic devices, each application program corresponds to a different application program identifier such as an icon, filename, button, or other interface object or element. When a user uses an electronic device, it is necessary to enter into the application program through an interaction with the application program identifier on the desktop or in the menu bar.

The inventor has identified the following technical problem in the prior art during realization of the technical schemes in the embodiments described herein: when a user starts the application program through the application program identifier, the function of the application program loaded and the application program interface displayed each time are always the same, and the user needs to click on the corresponding function after opening the application program if they need to use a certain function of the application program. For example, when the user uses the camera of a mobile phone and clicks on the camera identifier, a rear camera is turned on by default to acquire images. When taking a selfie, the user needs to turn on the front camera by clicking on the camera switching button, and cannot enter into a selfie mode directly by the application program identifier. That is to say, the loaded application program interface is fixed when the application program is started each time in the prior art; thus, there is a technical problem where the function of the application program identifier on the electronic device is singular.

SUMMARY

One embodiment of the present disclosure includes a method. The method includes determining a touch control parameter of a touch control operation at an identifier corresponding to an application program. The method also includes determining a touch control type based on the touch control parameter. The method also includes invoking a first element related to the application program in response to a determination that the touch control operation is a first type of touch control. The method also includes invoking a second element related to the application program in response to a determination that the touch control operation is a second type of touch control.

One embodiment of the present disclosure includes a device. The device includes a housing, a sensing apparatus, and a processing apparatus. The sensing apparatus is provided in the housing. The sensing apparatus detects a touch control operation on an identifier corresponding to an application program. The processing apparatus is provided in the housing and is connected with the sensing apparatus. The processing apparatus determines a touch control parameter of the touch control operation. The processing apparatus also determines a touch control type based on the touch control parameter. The processing apparatus also invokes a first element related to the application program in response to a determination that the touch control operation is a first type of touch control. The processing apparatus also invokes a second element relating to the application program in response to a determination that the touch control operation is a second type of touch control.

Some preferred but optional features or steps of the present application have been defined in the dependent claims.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
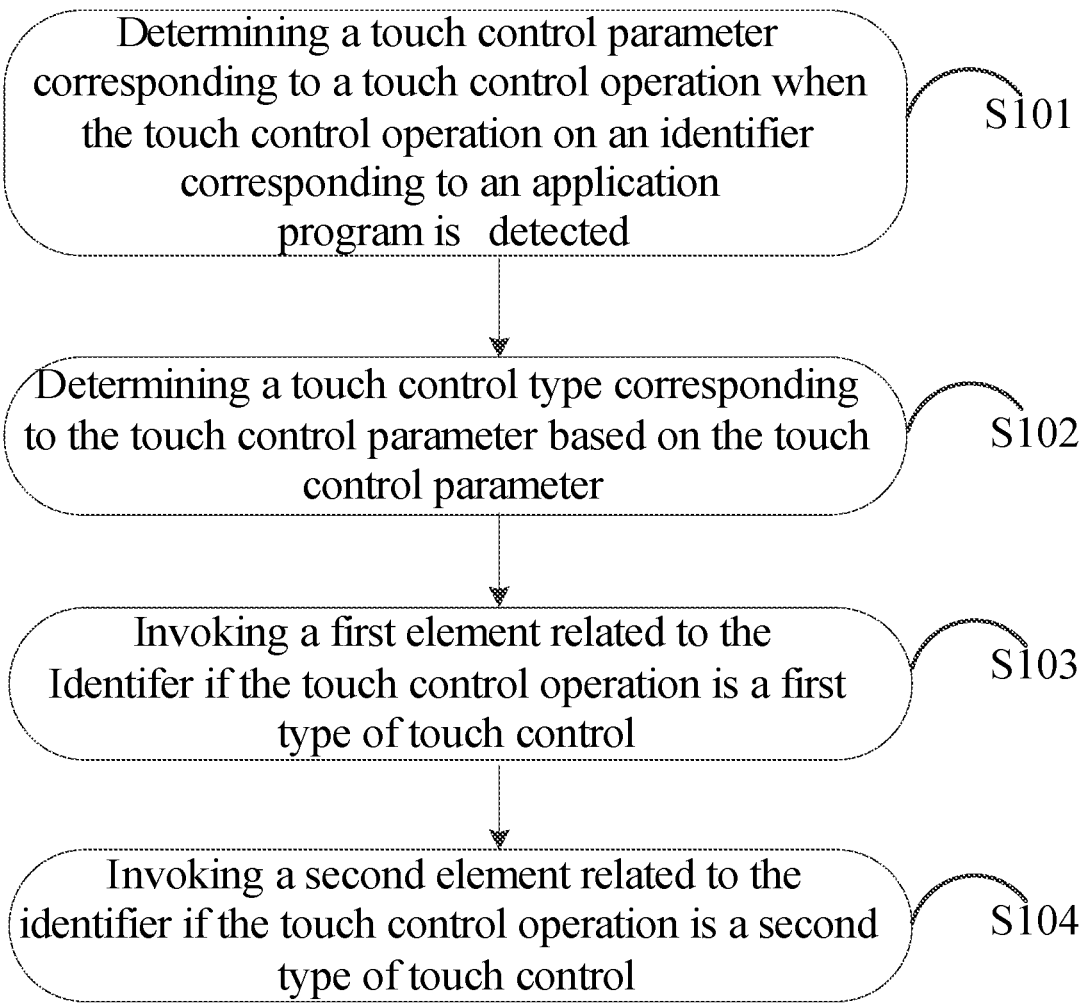
FIG. 1 is a flow diagram for implementation of an information processing method provided by one embodiment.

The technical schemes provided by the various embodiments described herein can be used to effectively solve the technical problem of the function of the application program identifier being singular in function on an electronic device. The embodiments described herein achieve the technical effect of enriching functions of an application program identifier.

Instead of requiring a user to access a program application before allowing the user to select a given mode or state of the program application, the embodiments described herein provide the ability to initiate a program application from an identifier, such as an icon, link, or other visual identifier, in a certain mode or element by detecting a type of user touch control at the identifier and opening the program application or another element such as a menu according to the touch control type. For example, if a user desires to open a camera in selfie mode, one type of gesture at the camera icon will open the camera application program in selfie mode instead of a default rear-facing camera mode. With a variety of potential gestures that may be detected at the identifier, a variety of elements or modes of the program application may be executed to provide greater efficiency and user-friendly performance.

According to the above, the touch control parameter corresponding to the touch control operation is determined when the touch control operation on the identifier corresponding to the application program is detected. The touch control type corresponding to the touch control parameter is determined based on the touch control parameter. The first element related to the identifier is invoked if the touch control operation is the first type of touch control. The second element related to the identifier is invoked if the touch control operation is the second type of touch control. That is to say, unlike in some conventional approaches (where a user needs to click on the application program identifier to enter an application interface of the application program in order to invoke different functions of the application program and switching between different application functions can only be realized by means of menu options on the application interface, with the entire operating process being relatively complicated), in the embodiments described herein, different components of the application program can be invoked and then switched according to different types of touch control operations on the application program identifier without the need for the user to enter the application program. Therefore, the embodiments described herein can be used to effectively solve the technical problem that the function of the application program identifier on the electronic device is singular, so as to achieve the technical effect of enriching the functions of the application program identifier.

In order to describe the embodiments herein or in prior art more clearly, brief descriptions of the drawings required for describing the embodiments are provided as follows. It is apparent that the drawings in the following descriptions are only some embodiments and examples, and those skilled in the art can also obtain other drawings according to the drawings provided without creative effort.

FIG. 1 illustrates one embodiment. In the illustrated embodiment, at block S101, a touch control parameter is determined. The touch control parameter corresponds to a touch control operation. The touch control parameter is determined when the touch control operation on an identifier corresponding to an application program is detected. At block S102, a touch control type is determined. The touch control type corresponds to the touch control parameter and is based on the touch control parameter.

At block S103, a first element related to the identifier is invoked if the touch control operation is a first type of touch control.

At block S104, a second element is invoked. The second element is related to the identifier and is invoked if the touch control operation is a second type of touch control.

Methods provided in the embodiments described herein can be applied to electronic devices containing a touch control display unit, for example, a touch screen mobile phone, tablet PC or touch control laptop. When the touch control display unit is in operation, the electronic device detects and obtains the touch control operation on the identifier on the touch control display unit through a sensor in the electronic device, such as a pressure sensor; wherein the touch control display unit can specifically be a touch control display screen, such as a capacitive touch screen, resistive touch screen, voltage-type touch screen, infrared touch screen or other types. Therefore, it shall not be specified in the embodiments.

In the embodiments described herein, the identifier corresponding to the application program can be an icon of the application program on a main interface of the electronic device, menu options on a display interface of the application program, or in other forms.

In the embodiments described herein, block S101 is executed first: determining the touch control parameter corresponding to the touch control operation when the touch control operation on an identifier corresponding to an application program is detected.

In the embodiments described herein, there are many types of touch control parameters in block S101, and the detailed description for each type of the touch control parameter is separately discussed below.

In one embodiment, the first implementation mode may include determining a touch control area of the touch control operation on an identifier.

Figure 2:
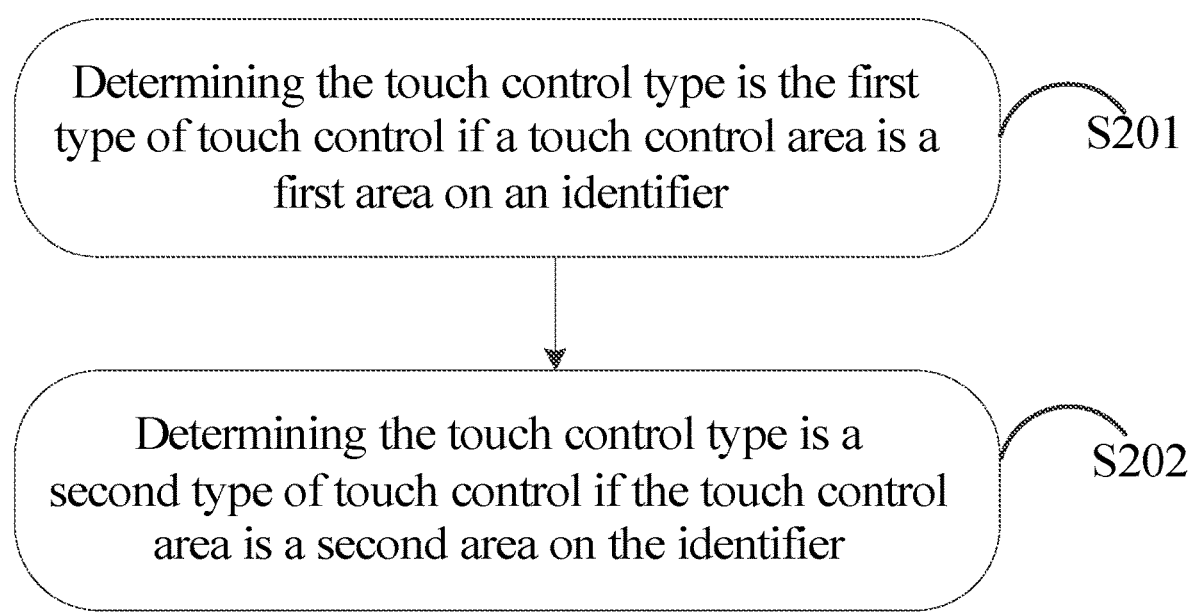
FIG. 2 is a flow diagram for practical application of Step S102 in an information processing method provided by one embodiment.

FIG. 2 illustrates one embodiment of the process performed at block S102 of FIG. 1. In particular, at block S201 the touch control type is determined to be the first type of touch control if the touch control area is a first area on the identifier.

At block S202, the touch control type is determined to be the second type of touch control if the touch control area is a second area on the identifier.

In the embodiments described herein, the touch control parameter can be the touch control area corresponding to the touch control operation. In practical application, the touch control area of the touch control operation on the identifier can be represented with coordinate points on the touch control display screen; for example, a top coordinate point and bottom coordinate point, (2, 2) and (2, 0) or (2, 5) and (2, 2), or other coordinate points of the touch control operation on the identifier.

In the embodiments described herein, after the touch control area of the touch control operation on the identifier is acquired, the touch control type of the touch control operation shall be determined based on the touch control area.

Figure 3:
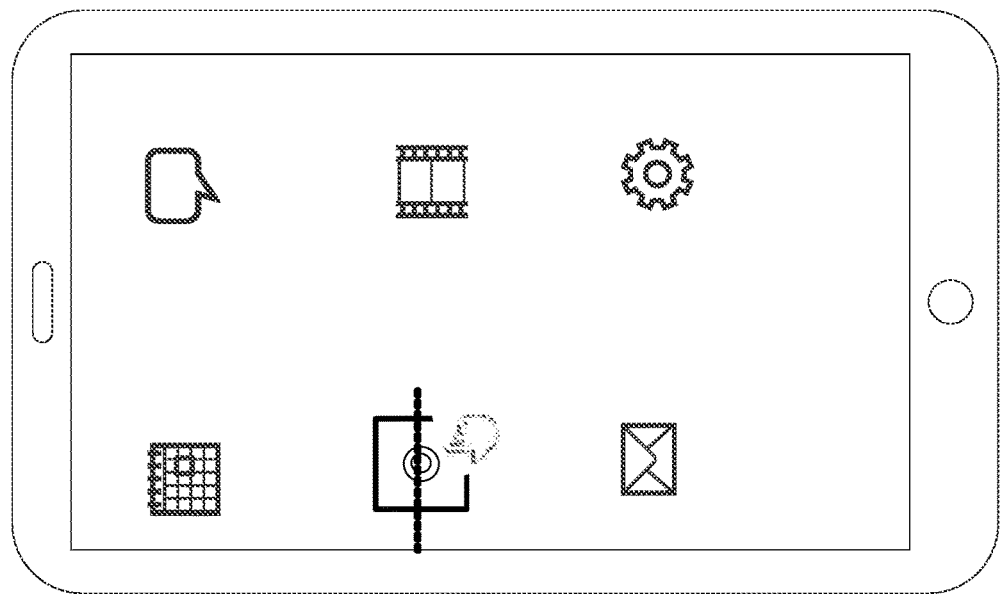
FIG. 3 is a schematic diagram in which a touch control parameter is a touch control region in an information processing method provided by one embodiment.

In practical application, as for an area of the identifier, the area from y=0 to y=5 (x>0) in a rectangular coordinate system is taken as an example, with the area from y=0 to y=2.5 (x>0) being a first area. The area from y=2.5 to y=5 (x>0) is a second area, as shown in FIG. 3. In practical application, as long as the top coordinate point of the touch control operation is in a certain area, the touch control area corresponding to the touch control operation is definitely in that area. Thus, the area of the touch control operation can be determined based on the top coordinate point of the touch control operation. Specifically, if an acquired top coordinate point of the touch control operation is (2, 2), which is in the first area from y=0 to y=2.5 (X>0), then the touch control area is the first area. If the acquired top coordinate point of the touch control operation is (2, 5), which is in the second area from y=2.5 to y=5 (x>0), then the touch control area is the second area.

In some embodiments described herein, if the touch control area is the first area, the type of the touch control operation is the first type of touch control; while if the touch control area is the second area, the type of the touch control operation is the second type of touch control. In practical application, the area of the identifier can be divided as leftward and rightward, as well as can be divided upward and downward, and can also be divided diagonally or in any other mode of division. A person skilled in the art can divide these according to the actual needs, therefore they shall not be specified in the embodiments described herein.

Another implementation mode includes determining a touch control track corresponding to the touch control operation. This may include determining a touch control direction corresponding to the touch control track based on the touch control track. Determining the touch control type for the touch control parameter may include determining the touch control type as the first type of touch control if the touch direction is in line with a first preset touch control direction or determining the touch control type as the second type of touch control if the touch control direction is not in line with the first preset touch control direction, or is in line with a second preset touch control direction.

In some embodiments described herein, a start position and an end position of the touch control track shall be firstly acquired to obtain the touch control track corresponding to the touch control operation, which is required to be determined when the touch control operation on the identifier is detected. In some embodiments, the start and the end positions of the touch control track can be represented with coordinate points on the touch control display; thus, the electronic device can acquire the coordinate points of the start and the end positions of the touch control track; for example, the coordinate point of the start position of the touch control track is (1, 0.5), and the coordinate point of the end position is (1, 3), or the coordinate point of the start position of the touch control track is (1, 3.5), and the coordinate point of the end position is (1, 1.5).

In some embodiments described herein, the touch control direction corresponding to the touch control track shall be determined after acquiring the touch control track corresponding to the touch control operation.

In some embodiments, the touch control direction can be determined by a vector of the touch control track, and the vector can specifically be represented by a difference value between a vertical coordinate of the end position and that of the start position of the touch control track. If the vector is more than zero and is an integer, the end position of the touch control track is above the start position, which means that the direction of the vector is upward. Conversely, if the vector is less than zero and is a negative, the end position of the touch control track is below the start position, which means that the first direction of the vector is downward. Specifically, if the coordinate point of the start position of the touch control track is (1, 0.5), and the coordinate point of the end position is (1, 3), the value of the vector of the touch control track is 2.5, and the vector value of 2.5 is more than 0, thus the direction of the vector is upward. If the coordinate point of the start position of the touch control track is (1, 3.5), and the coordinate point of the end position is (1, 1.5), the value of the vector of the touch control track is −2.0, which is less than 0, thus the direction of the vector is downward.

In some embodiments described herein, the touch control type of the touch control operation shall be determined based on the touch control track after acquiring the touch control direction of the touch control track.

Figure 4:
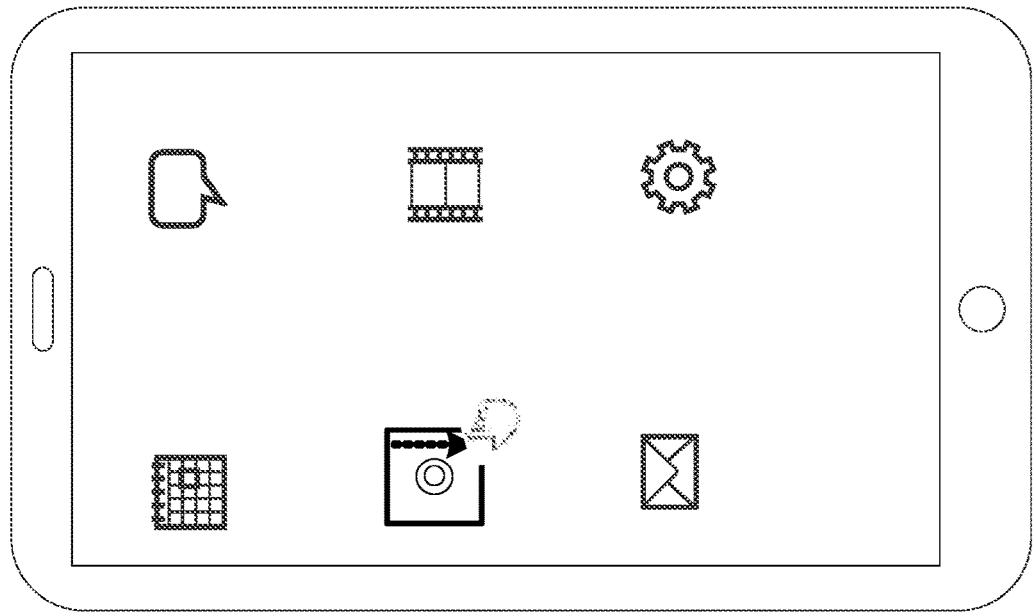
FIG. 4 is a schematic diagram wherein a touch control parameter is a touch control direction of a touch control track in an information processing method provided by one embodiment.

In some embodiments described herein, taking the upward touch control direction as the first preset touch control direction, and the downward as the second preset touch control direction as an example, please refer to FIG. 4 for details. At this time, if the touch control direction of the acquired touch control track is upward, the touch control direction is the first preset touch control direction; and if the touch control direction of the acquired touch control track is downward, the touch control direction is the second preset touch control direction. Accordingly, if the touch control direction is the first preset touch control direction, the touch control type is the first type of touch control; and if the touch control direction is the second preset touch control direction, the touch control type is the second type of touch control.

In some embodiments, the touch control direction can also be distinguished as leftward and rightward, as well as can be distinguished as upward and downward, and still can also be distinguished as diagonally or in any other distinctive directions. A person skilled in the art can set these according to the actual needs, therefore they shall not be specified in the embodiments described herein.

Another embodiment may include determining a touch control pressure value corresponding to the touch control operation. Using a touch control pressure value may include determining the touch control type corresponding to the touch control parameter based on the touch control parameter which, in some embodiments, includes determining the touch control type as the first type of touch control if the touch control pressure value is in range of a first touch control pressure value. Using the pressure value may further include determining the touch control type as the first type of touch control if the touch control pressure value is in range of a first touch control pressure value.

In some embodiments described herein, the touch control pressure value corresponding to the touch control operation shall be determined when the touch control operation on the identifier is detected. In some embodiments, the touch control pressure value can be acquired through a pressure sensor in the electronic device, such as 10 KPa, or 25 KPa or other pressure values.

The touch control type of the touch control operation, in one embodiment, shall be determined based on the touch control pressure value after acquiring the touch control pressure value corresponding to the touch control operation. In some embodiments described herein, the range of the first touch control pressure value can be 0 to 15 KPa, or 2 to 17 KPa, or other preset touch control pressure value ranges; and the range of the second touch control pressure value can be 15 to 28 KPa, or 20 to 30 KPa, or other preset touch control pressure value ranges. A person skilled in the art can set these according to the actual needs, therefore they shall not be specified in the embodiments described herein.

In some embodiments, if the touch control pressure value of the acquired touch control operation is 10 KPa, which is in range of the first preset pressure value, the touch control operation is the first type of touch control; and if the touch control pressure value of the acquired touch control operation is 25 KPa, which is in range of the second preset pressure value, the touch control operation is the second type of touch control.

In some embodiments described herein, whether to invoke the first element or the second element or other elements related to the identifier is determined according to the touch control type of the touch control operation. Specifically, a first element related to the identifier is invoked if the touch control operation is the first type of touch control; a second element related to the identifier is invoked if the touch control operation is the second type of touch control.

Hereinafter, taking the identifier used as an icon of a photo application program as an example, a detailed introduction to the information processing method is provided.

Specifically, when the touch control operation, which may be performed by a user, on the icon is detected, the corresponding touch control parameter of the touch control operation is determined, and then the corresponding touch control type according to the touch control parameter is determined. In some examples, a front camera is invoked if the user conducts the touch control at the upper part of the camera icon, a rear camera is invoked if a user conducts the touch control at the lower part of the camera icon, or the front camera is invoked if a user conducts the touch control from the top to the bottom of the camera icon; the rear camera is invoked if a user conducts the touch control from the bottom of the camera icon to the top of the camera icon; or, the front camera is invoked if a user conducts the touch control on the camera icon with high-threshold touching pressure; the rear camera is invoked if a user conducts the touch control on the camera icon with low-threshold touching pressure.

The technical scheme above is different from the methods in conventional approaches in which, when using the camera of a mobile phone, the user clicks on the camera icon, and the rear camera will be turned on by default to acquire the images. When taking a selfie, the user needs to start the camera program application, turn on the front camera by clicking on the camera switching button, and cannot enter a selfie mode directly by the application program identifier. In the present technical scheme, the front camera or rear camera can be turned on directly through the identifier of the application program, which brings great convenience to the users. Users do not need to enter the application program to conduct manual switching. Thus, the technical effect of improving user experience can be achieved.

Hereinafter, taking the interactive object used as the icon to identify the application program as an example, a detailed introduction to the information processing method is provided.

Specifically, at present, in order to ensure security and privacy, or to improve the security of payment, identifications are needed in the unlocking or payment of electronic devices; there are fingerprint identification, digital password identification, iris identification and other ways of identification.

In this embodiment, and in other embodiments, the fingerprint identification component is invoked if the detected touch control is at the upper part of the camera icon; the digital password identification component is invoked if the detected touch control is at the middle part of the camera icon; the iris identification component is invoked if the detected touch control is at the lower part of the camera icon. Through the technical schemes provided by embodiments described herein, any identification method above can be selected directly by using the application icon, rather than the user only being able to switch the identification method after starting one identification method and failing that identification method, making it a complicated process and consuming time. In comparison, the technical schemes shown in the embodiments described herein can provide better user experience.

Figure 5:
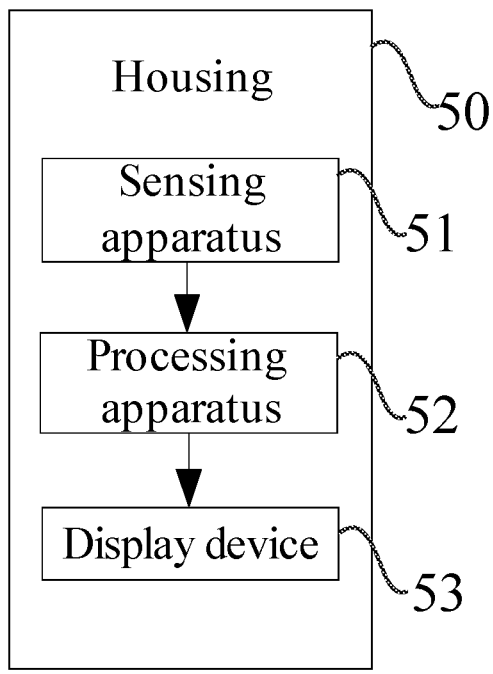
FIG. 5 is a structural diagram of an electronic device provided by one embodiment.

In the illustrated embodiment of FIG. 5, an electronic device is described.

The electronic device includes a housing 50, a sensing apparatus 51 provided in the housing 50, for detecting a touch control operation on an identifier corresponding to an application program, and a processing apparatus 52 provided in the housing 50, connected with a sensing apparatus 51, for determining a touch control parameter corresponding to the touch control operation. When the touch control operation is detected, the processing apparatus determines a touch control type corresponding to the touch control parameter based on the touch control parameter, invokes a first element related to the identifier if the touch control operation is a first type of touch control, and invokes a second element related to the identifier if the touch control operation is a second type of touch control.

In the illustrated embodiment, after invoking the first element related to the identifier, if the touch control operation is the first type of touch control, a display device 53, displays a display interface related to the first element. The display device 53 output (i.e. program application interface, menu, etc.) may vary based on a touch control track, direction, pressure value, or other criterion.

Figure 6:
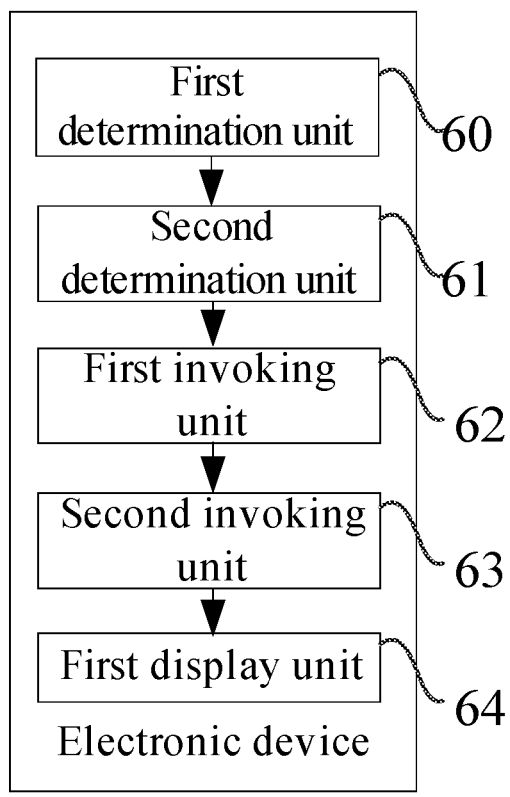
FIG. 6 is a structural diagram of an electronic device provided by one embodiment.

In the illustrated embodiment of FIG. 6, an electronic device is shown. The illustrated embodiment includes a first determination unit 60, a second determination unit 61, a first invoking unit 62, a second invoking unit 63 and a first display unit 64.

In one embodiment, the first determination unit 60 determines the touch control parameter corresponding to the touch control operation when the touch control operation on the identifier corresponding to the application program is detected.

The second determination unit 61 determines the touch control type corresponding to the touch control parameter based on the touch control parameter.

The first invoking unit 62 invokes a first element related to the identifier if the touch control operation is the first type of touch control.

The second invoking unit 63 invokes a second element related to the identifier if the touch control operation is the second type of touch control.

In one embodiment, after invoking the first element related to the identifier if the touch control operation is the first type of touch control, the first display unit 64 displays a display interface related to the first element.

In some embodiments, the first determination unit 60 includes a second determination module that determines the touch control type to be the first type of touch control if the touch control area is the first area on the identifier. The first determination unit may further include a third determination module that determines the touch control type to be the second type of touch control if the touch control area is the second area on the identifier.

In some embodiments, the first determination unit 60 includes a fourth determination module that determines the touch control track corresponding to the touch control operation and a fifth determination module that determines the touch control direction corresponding to the touch control track based on the touch control track.

In some embodiments, the second determination unit 61 includes a sixth determination module that determines the touch control type as the first type of touch control if the touch control direction is in line with the first preset touch control direction and a seventh determination module that determines the touch control type as the second type of touch control if the touch control direction is not in line with the first preset touch control direction. The seventh determination module may also identify the touch control type as the second type if the touch control direction is in line with the second preset touch control direction.

In another embodiment, the first determination unit 60 includes an eighth determination module that determines the touch control pressure value corresponding to the touch control operation and the second determination unit 61 includes a ninth determination module that determines the touch control type as the first type of touch control if the touch control pressure value is in range of the first touch control pressure value.

The second determination unit 61 may further include a tenth determination module that determines the touch control type to be the second type of touch control if the touch control pressure value is not in range of the first touch control pressure value, or is in range of the second touch control pressure value.

A person skilled in the art should realize that embodiments herein may be provided as a method, a system or a computer program product. Therefore, the embodiments described herein may be in the form of a hardware-only embodiment, a software-only embodiment, or an embodiment of a combination of hardware and software. Moreover, some embodiments may be in the form of a computer program product which is implemented on one or more computer available storage media (including, but not limited to, disk storage, CD-ROM, optical storage, and the like) which comprises computer available program codes.

Embodiments are described with reference to the methods, devices, systems, and flow diagrams and/or block diagrams of computer program products according to the embodiments described here. It should be understood that computer program commands may be used to implement each process and/or block in the flow diagrams and/or block diagrams, and combinations of processes and/or blocks in the flow diagrams and/or block diagrams. The computer program commands may be provided to a universal computer, a dedicated computer, an embedded processor or the processor of another programmable data processing apparatus to generate a machine, such that the computer or the processor of another programmable data processing apparatus executes commands to generate a unit to implement functions designated in one or more processes in a flow diagram and/or one or more blocks in a block diagram.

The computer program commands may also be stored in a computer readable storage that can cause a computer or another programmable data processing apparatus to work in a specific manner, such that the commands stored in the computer readable storage generates a product comprising an instruction unit, and the instruction unit implements functions designated by one or more processes in a flow diagram and/or one or more blocks in a block diagram.

The computer program commands may also be installed in a computer or another programmable data processing apparatus, such that a series of operation steps are executed on the computer or another programmable device to generate a computer implemented processing, and therefore, the commands executed in the computer or another programmable device provide steps for implementing functions designated in one or more processes in a flow diagram and/or one or more blocks in a block diagram.

Specifically, the computer program commands corresponding to the information processing method in the embodiments described herein can be stored in a storage medium such as an optical disc, a hard disk, and a USB flash disk.

Although some preferred embodiments have been described, a person skilled in the art may make additional alterations and modifications on these embodiments once they know the basic creative concept. Thus, the attached claims are intended to be explained as including the preferred embodiments and all variations and modifications that fall within the scope described herein.

It is clear that various variations and modifications to the described embodiments may be made by those skilled in the art without departing from the spirit and scope of the described embodiments. Accordingly, if these variations and modifications to the embodiments described herein fall within the scope of the claims provided herein and the equivalents thereof, it is also intended that the present embodiments encompass these variations and modifications.

What is claimed is:

1. A method, comprising:
   determining a touch control parameter of a touch control operation at an identifier that is static and corresponds to a single application program, the touch control parameter comprising a characteristic of the touch control operation, the touch control operation comprising a touch interaction at a display, wherein determining the touch control parameter further comprises:
   determining a touch control type based on the touch control parameter, wherein determining the touch control type further comprises:
      determining a touch control area of the touch control operation at the identifier;
      determining the touch control type is a first type of touch control in response to a determination that the touch control area is a first area of the identifier;
      determining the touch control type is a second type of touch control in response to a determination that the touch control area is a second area of the identifier different from the first area of the identifier;
   invoking a first mode of the application program in response to a determination that the touch control operation is the first type of touch control; and
   invoking a second mode of the application program in response to a determination that the touch control operation is the second type of touch control.

2. The method according to claim 1, wherein the method further comprises:
   displaying a display interface related to the first mode.

3. The method according to claim 1, wherein determining the touch control parameter further comprises:
   determining a touch control pressure value.

4. The method according to claim 3, wherein determining the touch control type comprises:
   determining the touch control type based on a determination that the touch control pressure value is in range of a first touch control pressure value; and
   determining the touch control type based on a determination that the touch control pressure value is not in range of the first touch control pressure value, or is in range of a second touch control pressure value.

5. A device, comprising:
   a housing;
   a sensing apparatus provided in the housing that detects a touch control operation on an identifier that is static and corresponds to a single application program; and
   a processing apparatus provided in the housing, the processing apparatus connected with the sensing apparatus that is configured to:
      determine a touch control parameter of the touch control operation, wherein the processing apparatus is further configured to:
      determine a touch control type based on the touch control parameter, wherein the processing apparatus is further configured to:
         determine the touch control pressure value;
         determine the touch control type is a first type of touch control in response to a determination that the touch control pressure value is in range of a first touch control pressure value; and
         determine the touch control type is a second type of touch control in response to a determination that the touch control pressure value is not in range of the first touch control pressure value or is in range of a second touch control pressure value;

invoke a first mode of the application program in response to a determination that the touch control operation is the first type of touch control; and invoke a second mode of the application program in response to a determination that the touch control operation is the second type of touch control.

6. The device according to claim 5, further comprising: a display device that displays a display interface related to the first mode.

7. The device according to claim 5, wherein the processing apparatus is further configured to:

determine a touch control area of the touch control operation at the identifier;

determine that the touch control type based on a determination that the touch control area is a first area of the identifier; and determine that the touch control type based on a determination that the touch control area is a second area of the identifier.

8. The device of claim 5, wherein at least one of the first mode and the second mode comprises executing the application program in a corresponding non-default state.

9. A system comprising:

a housing;

a display device coupled to the housing to provide a touch control display;

a sensing apparatus provided in the housing to detect a touch control operation on an identifier displayed on the touch control display, wherein the identifier is static and corresponds to a single application program; and a processing apparatus provided in the housing, the processing apparatus connected with the sensing apparatus that is configured to:

determine a touch control parameter of the touch control operation, wherein the processing apparatus is further configured to:

determine a touch control track of the touch control operation, the touch control track crossing the touch control display, intersecting the identifier, and comprising a portion of the touch control track traversing at least a portion of the identifier;

determine a start point of the touch control track corresponding with a first coordinate on the identifier;

determine an end position of the touch control track corresponding with a second coordinate on the identifier; and determine a touch control direction of the touch control track based on the portion of the touch control track corresponding to the identifier;

determine a touch control type based on the touch control parameter, wherein the processing apparatus is further configured to:

determine the touch control type is the first type of touch control in response to a determination that the touch control track and touch control direction corresponds to a first preset value; and determine the touch control type is the second type of touch control in response to a determination that the touch control track and the touch control direction does not correspond to the first preset touch value;

invoke a first mode of the application program on the touch control display in response to a determination that the touch control operation is the first type of touch control; and invoke a second mode of the application program on the touch control display in response to a determination that the touch control operation is the second type of touch control.

10. The system of claim 9, wherein the touch control type is further determined based on a touch control area of the touch control operation at the identifier.

11. The system of claim 9, wherein the touch control type is further determined based on a touch control pressure value of the touch control operation at the identifier.

12. The system of claim 9, wherein the touch control direction comprises a vector determined from the first coordinate on the identifier and the second coordinate on the identifier.

13. The system of claim 12, wherein the vector is negative if the first coordinate is above the second coordinate on the identifier and positive if the first coordinate is below the second coordinate on the identifier.

14. The system of claim 12, wherein the vector is determined as leftward or rightward based on the first coordinate relative to the second coordinate on the identifier.

* * * * *